Jan. 12, 1943.  I. M. CHAMBERS  2,308,054
RAILWAY CAR TRUCK
Filed May 19, 1941  2 Sheets-Sheet 1
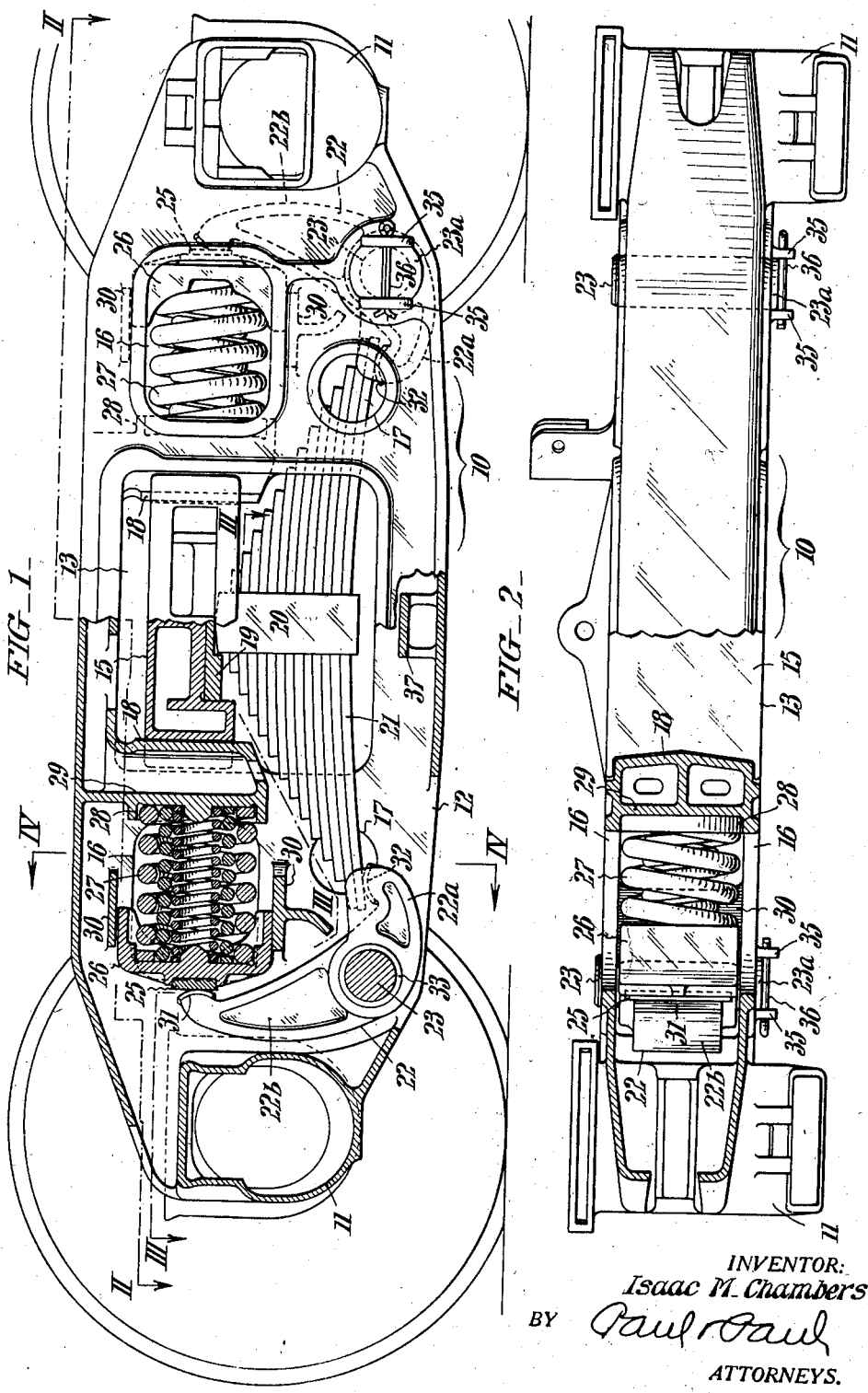
INVENTOR:
Isaac M. Chambers,
BY Paul & Paul
ATTORNEYS.

Jan. 12, 1943.  I. M. CHAMBERS  2,308,054
RAILWAY CAR TRUCK
Filed May 19, 1941  2 Sheets-Sheet 2
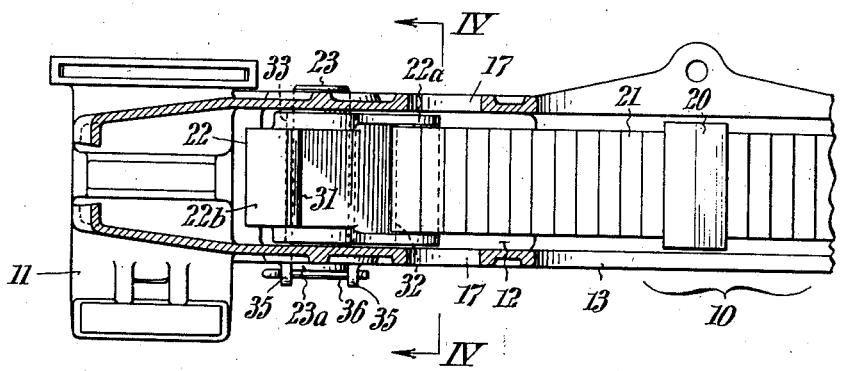
FIG_3_
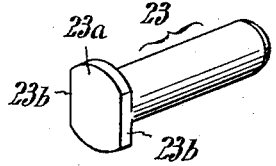
FIG_5_
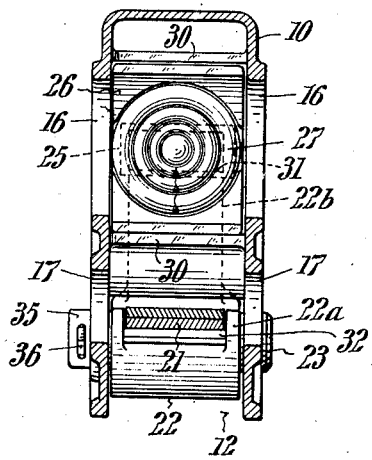
FIG_4_
WITNESSES:
Hubert Fuchs
George Lewis Comly
INVENTOR:
Isaac M. Chambers,
BY
Paul & Paul
ATTORNEYS.

Patented Jan. 12, 1943

2,308,054

UNITED STATES PATENT OFFICE 2,308,054

RAILWAY CAR TRUCK

Isaac M. Chambers, Narberth, Pa.

Application May 19, 1941, Serial No. 394,129

9 Claims. (Cl. 105—197.1)

This invention relates to railway car trucks. In connection with such trucks, I aim to provide for maximum deflection of the truck bolster consistent with coupled height limits and thereby secure easier and smoother riding qualities than possible of attainment in car trucks as heretofore generally constructed.

Another object of my invention is to secure the above advantages in a car truck composed of few parts which lend themselves to compact arrangement, and which can be easily and quickly assembled in the side frames of the truck without requiring the use of any special tools for the purpose.

The foregoing objects and advantages I realize in practise as hereinafter more fully disclosed, through provision of semi-elliptic leaf springs for supporting the ends of the truck bolster, and motion-translating elements movably connected to the side frames of the truck whereby the movements induced in the leaf springs incident to flexure are transferred to horizontally disposed resilient auxiliary cushioning members in series with said leaf springs, the aforesaid parts at each side of the truck being so configured and arranged as to be all snugly accommodated within vertical hollows in the side frames.

Other objects and attendant advantages will appear from the following detailed description of the attached drawings, wherein Fig. 1 shows my improved railway truck in side elevation with a portion of the side frame nearest the observer in longitudinal section.

Fig. 2 is a view partly in top plan and partly in horizontal section along the staggered plane indicated by the broken line II—II in Fig. 1 and looking in the direction of the arrows at the ends of said line.

Fig. 3 is a fragmentary detail view in section along the staggered plane indicated by the broken line III—III in Fig. 1 and looking in the direction of the arrows at the ends of that line.

Fig. 4 is a detail view in cross-section taken as indicated by the angled arrows IV—IV in Figs. 1 and 3; and Fig. 5 is a perspective view of one of the parts of the truck structure.

With more detailed reference to these illustrations, 10 comprehensively designates one of the side frames of the truck, which, at its opposite ends has integrally-formed journal boxes 11 for the wheel axles (not shown). It is to be understood that the side frame at the opposite side of the truck is identical both as regards to its form and its appointments (presently described) with the one illustrated, each being of hollow construction with access openings 12, 12 in its bottom adjacent the journal boxes 11, and a central transverse opening 13 of square configuration into which the corresponding end of the truck bolster 15 projects. The frame 10 is moreover provided in its upper part with smaller generally rectangular openings 16 in the intervals between the journal boxes 11 and the central opening 13, and also with circular openings 17 below the openings 16. As shown in Fig. 1, the end of the bolster 15 engages vertical guides 18 at opposite sides of the transverse central opening 13 of the frame 10 and is recessed at the bottom for the reception of a cap plate 19 which bears upon the centrally disposed band 20 of a semi-elliptic leaf spring 21 within the hollow of the side frame 10. As further shown in Fig. 1, the ends of the leaf spring 21 rest within side-flanged saddle-like seats on the short horizontal arms or limbs 22a of motion-translating elements in the form of bell cranks 22 which are fulcrumed on pins 23 extending cross-wise of the hollow of the side frame 10 near the bottom of the latter adjacent the journal boxes 11. The longer upright arms or limbs 22b of the bell crank elements 22 bear in turn against renewable wear plates 25 recessed centrally into caps 26 which fit over the outer ends of resilient auxiliary compression or cushioning members in the form of nested helical springs 27 whereof the axes extend horizontally in fore and aft direction. As shown the opposite or inner ends of the components of these helical springs are engaged in seats 28 formed on integral cross webs 29 internally of the frame 10 which webs constitute the backs of the bolster end guides 18. The caps 26, it will be noted, are confined to axial movement in horizontal slideways 30 aligned with the seats 28. Preferably, the arms 22a and 22b of the bell cranks 22 are provided with rounded facings 31 and 32 which can be replaced to compensate for wear when desirable or necessary. For like reasons, the bell cranks 22 are bushed as at 33, and, except for slight working clearance, correspond in width to the hollow of the frame 10, see Figs. 2–4. The shanks of the fulcrum pins 23 fit snugly into aligned apertures in the opposite side walls of the frame, and are provided with heads 23a having flattened parallel side edges 23b (Fig. 5) which fit closely the intervals between pairs of laterally-spaced projecting lugs 35 on the frame 10. Through this arrangement, the fulcrum pins 23 are locked against rotation; while retaining cotter pins 36 extending cross-wise between the lug pairs 35 over the heads 23a of the fulcrum pins 23 serve as a means for holding the latter in place in the frame 10. The transversely-extending stop shown at 37 in Fig. 1 centrally of the lower part of the frame 10 in addition to limiting the downward movement of the leaf spring 21, serves for another purpose which will be presently pointed out.

In the operation of the truck, the car load is transferred at each side of the truck from the end of the bolster 15 to the leaf spring 21. The flexing motion set up in the ends of each leaf spring 21 is communicated to the bell crank elements 22, and by them in turn transmitted in increased ratio to the serially-related nested helical springs 27. In this way, it will be seen that the shocks attending travel of the truck are directly transferred to the springs 27 and the car load applied to the side frame 10 a short distance from the center line of the journals, no other load being applied to the tension side of the frame between these points until the band 20 of the elliptic spring engages the stop 37 on said frame. It will thus be apparent that the described arrangement permits maximum deflection of the bolster consistent with coupler height limits whereby improved riding qualities are obtained notwithstanding the compact grouping of the component parts within the truck frames.

The method of assembling the truck is as follows:

The leaf spring 21 is first inserted endwise into the hollow of the frame 10 from beneath through one of the bottom openings 12 and temporarily held in position under the end of the bolster 15 by a suitable spacer block (not illustrated) placed between the bottom of the spring band 20 and the stop 37. The spring caps 26 are then introduced through the side openings 16 in the frame 10 and moved rearward in the guideway 30 against the journal boxes 11. The helical springs 27 are next inserted through the openings 16 and the caps 26 brought forward into engagement with said springs. With this accomplished, the bell cranks 22 are introduced upwardly through the openings 12 and the fulcrum pins 23 inserted into the apertures provided for them in the side walls of the frame 10 and at the same time passed through the bushed fulcrum bores of said bell cranks. The cotter pins 36 are thereupon placed in the lug pairs 35 for retainment of the fulcrum pins 23, and finally the aforementioned spacer block is removed to allow the ends of the leaf spring 21 to seat within the saddles on the short arms 22a of the bell cranks 22 as shown in Fig. 1. From the immediately foregoing, it will be evident that the component parts of the spring system can be easily and quickly assembled in the side frames without necessitating the aid of special tools or apparatus.

Having thus described my invention I claim:

1. In a railway car truck, a side frame with a transverse central opening and with journal boxes respectively at its opposite ends for wheel axles; a bolster with one end extending into the central opening of the frame; a leaf spring whereon the end of the bolster is supported; a compression member arranged horizontally in fore and aft direction above the leaf spring in the interval between the journal boxes, with one end thereof engaging a seat on the side frame; and a bell crank lever fulcrumed on the side frame, said lever having a horizontal arm in engagement with one end of the leaf spring, and a vertical arm which extends upward and engages the other end of said compression member.

2. A truck frame according to claim 1, in which the side frame is hollow, and in which the leaf spring, the compression means and the lever are all housed within the side frame.

3. A railway car truck according to claim 1, in which the side frame is hollow; in which the leaf spring, the compression means, and the lever are all disposed within the hollow of the side frame; and in which the side frame is provided with openings in its bottom and in its side walls to facilitate introduction and manipulation of the aforesaid parts incident to assembly.

4. In a railway car truck, a side frame with a transverse central opening and with journal boxes respectively at its opposite ends for wheel axles; a bolster with one end extending into the central opening of the frame; a leaf spring whereon the end of the bolster is supported, a pair of compression members arranged horizontally in fore and aft direction above the leaf spring in the interval between the journal boxes, each such compression member having one end in engagement with a seat on the side frame; and bell crank levers fulcrumed on the side frame, said levers having horizontal arms respectively in engagement with the ends of the leaf spring, and vertical arms which extend upward and respectively engage opposite ends of the compression members.

5. A railway car truck according to claim 4, in which the side frame is hollow and in which the leaf spring, the compression members, and the levers are all housed within the hollow of the side frame.

6. A railway car truck according to claim 1, wherein the side frame is hollow; wherein the leaf spring, the compression means and the lever are all housed within the hollow of the side frame; and wherein the fulcrum for the lever is in the form of a pin which extends crosswise of the frame through one of its side walls, said pin having a head with parallel side edges locked between laterally spaced lugs on the corresponding side wall of the frame, and being held in place by a keeper pin passed transversely through aligned apertures in said lugs and overlying the head of said fulcrum pin.

7. A railway car truck according to claim 4, wherein the side frame is hollow; wherein the leaf spring, the compression members and the levers are all housed within the hollow of the side frame; and wherein the fulcrum for each lever is in the form of a pin which extends crosswise of the frame through one of its side walls, said pin having a head with parallel side edges locked between laterally spaced lugs on the corresponding side wall of the frame and being held in place by a keeper pin passed transversely through aligned apertures in said lugs and overlying the head of said fulcrum pin.

8. In a railway car truck, a side frame with a transverse central opening and with journal boxes respectively at its opposite ends for wheel axles; a bolster with one end extending into the central opening of the frame; a leaf spring whereon the end of the bolster is supported; a pair of compression members arranged horizontally in fore and aft direction respectively above the ends of the leaf spring in intervals between the central opening of the side frame and the journal boxes, with their inner ends engaging seats on said side frame; bell crank levers fulcrumed on the side frame near the bottom and adjacent the journal boxes, said levers having horizontal arms whereon the ends of the leaf spring bear, and vertical arms which extend upward and bear against the outer ends of the compression members.

9. A railway car truck according to claim 8, wherein the side frame is hollow between the journal boxes; and wherein the leaf spring, the compression members and the levers are all housed within the hollow of said frame.

ISAAC M. CHAMBERS.